UNITED STATES PATENT OFFICE.

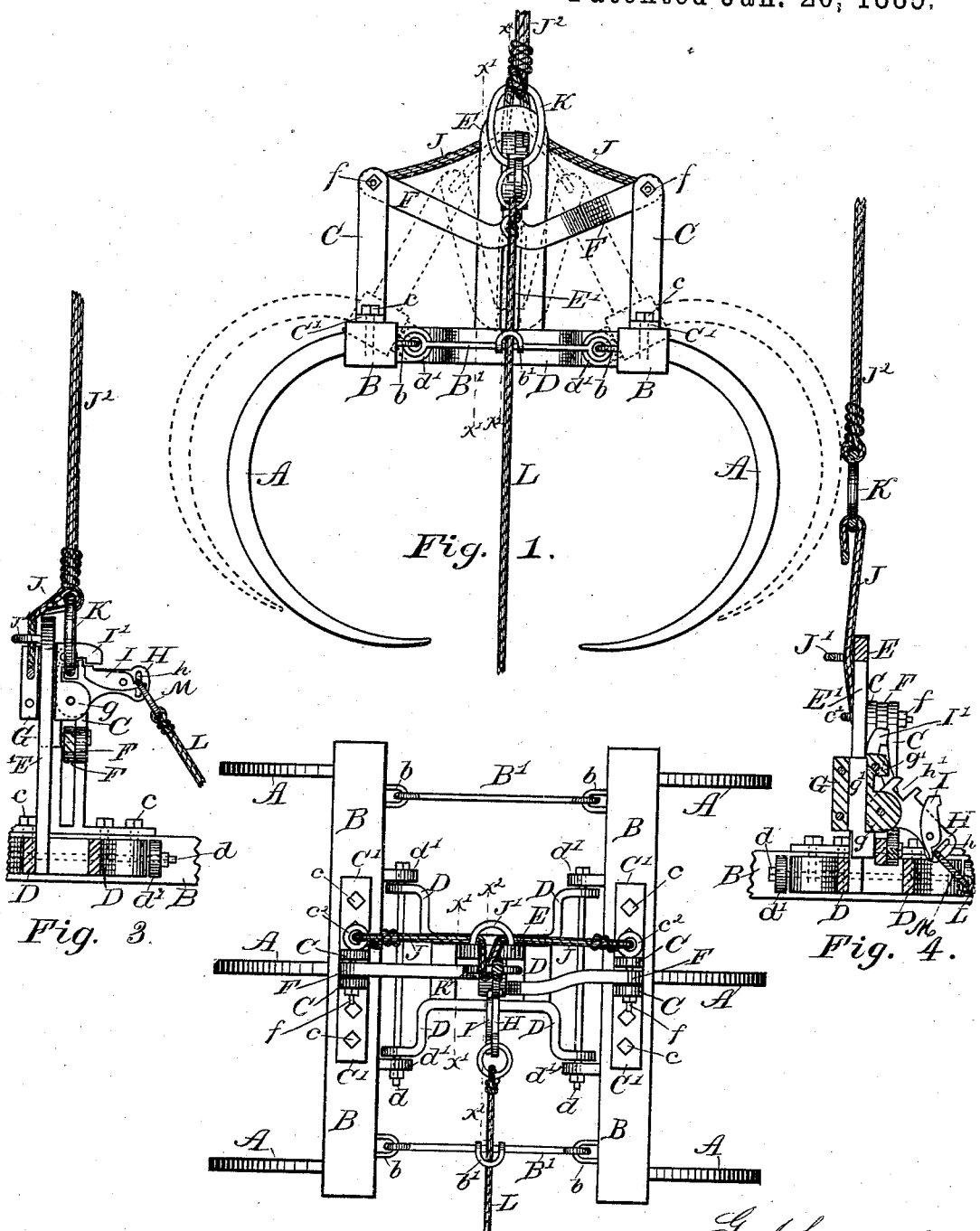

GUSTAF JOHNSON AND NELS R. JOHNSON, OF LARIAT, COLORADO.

HORSE HAY-FORK.

SPECIFICATION forming part of Letters Patent No. 310,949, dated January 20, 1885.

Application filed May 29, 1884. (No model.)

*To all whom it may concern:*

Be it known that we, GUSTAF JOHNSON and NELS R. JOHNSON, of Lariat, in the county of Rio Grande and State of Colorado, have invented certain new and useful Improvements in Hay-Forks; and we do hereby declare that the following is a full, clear, and exact description of the invention, which will enable others skilled in the art to which it appertains to make and use the same, reference being had to the accompanying drawings, and to letters of reference marked thereon, which form a part of this specification.

The object of this improvement is an efficient horse hay-fork. The invention consists in the peculiar construction and arrangement of the parts, as will be hereinafter fully explained, and specifically claimed, reference being had to the drawings herewith filed as part hereof, in which the same letters of reference denote the same parts in the different views.

Figure 1 is a side elevation. Fig. 2 is a top view. Fig. 3 is a vertical section taken on the line $x'\ x'$ of Fig. 1. Fig. 4 is a section taken on the line $x^2\ x^2$ of same figure.

A A are tines secured by any suitable means to the beams B.

C C are metal standards, having laterally-extended perforated bases C', bolted to the tine-beams B, as shown at $c$.

B' B' are rods having eyes at each end, by which they are flexibly secured to the tine-beams B by means of staples $b$.

D D is a metal frame, to which the tine-beams B are hinged by means of eyes $d'$, affixed thereto, and the rods $d$, passing through the same and adjacent eyes in the frame D.

E is a standard or guide suitably secured to the metal frame D, and provided with a slot for the reception of a trigger-carriage, G, having a pivoted trigger-carrying arm, H, pivoted thereto by a pin, $g$, the arm H being provided with a slot, $h$, for the reception of a ring, M, to which a rope, L, is connected, and a notch, $h'$, in the arm H, for a purpose hereinafter set forth.

F F are toggle-bars pivoted to the standards C by the bolts $f$, and having their inner ends affixed to the trigger-carriage G.

I' is a notched trigger-latch pivoted to the carriage G.

I is the trigger pivoted to the trigger-carriage hinged extension H, and provided with a projection at its inner end, the same being arranged to engage with the point or end of the trigger-latch I', and a reduced extension at its outer end, arranged to lap over the slot $h$ in the part H when the trigger is set, as shown in Fig. 3.

J J is a rope running through the loop or staple J', affixed to the trigger-carriage guide E, connecting the hoisting-rope $J^2$ with the toggle-standards C C by means of eyes $c^2$, forming heads for the bolts $f$, which join the toggle-bars F F to the standards C.

K is a metal link or loop secured to the hoisting-rope $J^2$, and arranged to be set over the projection $g'$ of the trigger-carriage G, and into the notch $h'$ of the part H, as fully shown in Figs. 1 and 3. After the tines have been inserted into the hay, the fork is lifted by means of a horse or other suitable power, drawing the rope $J^2$ over a suitable roller until it reaches the desired elevation and the fork is in position for discharging the hay, which is accomplished by jerking the rope L, when the trigger will be disengaged, as shown in Fig. 4, and the tines will take the position indicated by the dotted profile lines in Fig. 1, and the load thereby instantaneously released in the locality desired, which operation may be repeated as often as necessary.

Having explained the construction and operation of our invention, what we claim as new, and desire to secure by Letters Patent, is—

1. In a horse hay-fork, the trigger-carriage G, having a pivoted trigger-carrying arm, H, provided with a notch, $h'$, slot $h$, trigger I, trigger-latch I', and the slotted carriage-guide E', substantially as set forth.

2. The trigger-carriage provided with trigger-latch I', pivoted trigger-carrying arm H, and trigger I, arranged to operate as described, in combination with the carriage-guide E', frame D, toggles F, standards C, link K, ring M, beams B, having tines A, and the operating-ropes J J' $J^2$, substantially as set forth.

In testimony that we claim the foregoing as our own we affix our signatures in presence of two witnesses.

GUSTAF JOHNSON.
NELS R. JOHNSON.

Witnesses:
J. KNOX BURTON,
C. S. ALDRICH.